United States Patent [19]

Rastas et al.

[11] 4,219,354

[45] Aug. 26, 1980

[54] HYDROMETALLURGICAL PROCESS FOR THE TREATMENT OF OXIDES AND FERRITES WHICH CONTAIN IRON AND OTHER METALS

[75] Inventors: Jussi K. Rastas; Sigmund P. Fugleberg; Seppo O. Heimala; Sitg-Erik Hultholm, all of Pori; Jaakko T. I. Poijärvi, Vanha-Ulvila, all of Finland

[73] Assignee: Outokumpu Oy, Helsinki, Finland

[21] Appl. No.: 955,500

[22] Filed: Oct. 27, 1978

[30] Foreign Application Priority Data

Nov. 28, 1977 [FI] Finland .................................. 773588

[51] Int. Cl.² .................... C22B 19/22; C22B 23/04; C22B 15/08; C22B 47/00
[52] U.S. Cl. .................... 75/101 R; 75/115; 75/117; 75/120; 75/121; 75/119; 204/119; 423/143; 423/146
[58] Field of Search .................... 75/115, 101 R, 117, 75/120; 423/143, 146, 101, 106; 204/119

[56] References Cited

U.S. PATENT DOCUMENTS

| | | | |
|---|---|---|---|
| 1,834,960 | 12/1931 | Mitchell | 75/115 X |
| 2,599,816 | 6/1952 | Ellsworth | 75/120 X |
| 3,434,947 | 3/1969 | Steintveit | 75/108 X |
| 3,493,365 | 2/1970 | Pickering et al. | 75/120 X |
| 3,676,107 | 7/1972 | Barnard et al. | 75/115 X |
| 3,753,692 | 8/1973 | Bourchier et al. | 75/115 |
| 3,910,784 | 10/1975 | Rastas | 75/120 X |
| 3,959,437 | 5/1976 | Rastas et al. | 423/41 X |

Primary Examiner—G. Ozaki
Attorney, Agent, or Firm—Brooks, Haidt, Haffner & Delahunty

[57] ABSTRACT

A hydrometallurgical process for the treatment of a raw material which contains iron and other metals, with a sulfuric acid solution, in order to dissolve the metals and to precipitate and separate the iron, the separated metal sulfate solution being exposed to evaporation in order to crystallize and separate the metal sulfates from the mother liquor, which is recycled to the treatment stage performed with sulfuric acid solution, and the separated metal sulfate being recovered.

8 Claims, 4 Drawing Figures

HYDROMETALLURGICAL PROCESS FOR THE TREATMENT OF OXIDES AND FERRITES WHICH CONTAIN IRON AND OTHER METALS

BACKGROUND OF THE INVENTION

The present invention relates to a hydrometallurgical process for the treatment of a raw material which contains iron and other metals, by means of a sulfuric acid solution in order to dissolve the metals and to precipitate the iron.

Various processes for the treatment of zinc ferrite have been used in conjunction with the electrolytic zinc process. The present invention is not, however, limited to the treatment of zinc ferrites, but it can be generally applied to the treatment of zinc-, copper-, cobalt-, nickel-, cadmium-, magnesium-, and manganese-bearing raw materials which contain iron and which, when dissolved in sulfuric acid, form $Fe_2(SO_4)_3$- and $MeSO_4$-bearing solutions (Me=Zn, Cu, Co, Ni, Cd, Mg, Mn). Zinc ferrite ($ZnFe_2O_4$) is produced in the roasting of iron-bearing sulfidic acid concentrates. It is the most important zinc-bearing secondary component in the calcine. The zinc bound in it can amount to ten percent, or more, of the entire zinc content of the calcine. The principal component of the calcine is zinc oxide. The calcine is leached in a sulfuric acid-bearing solution. The leaching process yields a virtually iron-free (iron concentration < 20 mg/l) "neutral" zinc sulfate solution. This is achieved in the so-called neutral leach, in which the initial pH range is 1.5–2 and the final pH range is 4–5. Most of the zinc oxide of the calcine dissolves under these conditions. The iron which has possibly passed into the solution early during the leach precipitates towards the end of this stage as hydroxide. After this stage the solution is fed to solution purification and then to electrolysis, in which the zinc is precipitated as metal and the sulfuric acid is regenerated. This regenerated solution, the return acid, is returned to the calcine leach, and thereby a closed solution cycle is obtained. A closed solution cycle has many advantages, but in practice difficulties are also encountered. One difficulty is the insufficient volume of water used for washing the precipitates which have been removed from the process, as the maintenance of the water balance in the leach process does not tolerate the admission of very large washing water volumes into the system. Another difficulty involved in a closed solution cycle is the concentration of certain elements, especially magnesium, in the cycled electrolyte; their removal from the electrolyte requires considerable additional measures and expense.

The leach residue from the neutral stage consists mainly of zinc ferrite, which does not dissolve under the conditions of this leaching stage. For a long time ferrite residue constituted a problem in zinc processing, since suitable hydrometallurgical methods had not been developed for its treatment. The principal problem was the lack of a technologically implementable method for the precipitation of iron. After 1965, however, experts in the field became generally aware of a zinc process in which the iron was precipitated as a crystalline jarosite compound $(AFe_3(SO_4)_2(OH)_6; A=Na, NH_4)$ which can be easily separated from the solution. In this process the ferrites are leached in a sulfuric acid solution, a normal return acid, whereby a sulfuric acid-bearing solution of iron and zinc sulfates is obtained. The leaching stage is normally called strong acid leach. The average concentrations of the solutions produced in it are as follows: $[H_2SO_4] \approx 50$ g/l, $[Fe^{3+}] \approx 35$ g/l, and $[Zn^{2+}] \approx 100$ g/l. The pH of the free sulfuric acid is raised, using calcine, to approximately 1.5 and the iron is precipitated in the presence of $NH_4^+$, $Na^+$ or $K^+$ ions by maintaining the pH at the said value by means of additions of calcine as jarosite according to Reaction Equation (1).

$$3Fe_2(SO_4)_3(aq) + 6ZnO(s) + Na_2SO_4(aq) + 6H_2O(aq) \rightarrow 2Na[Fe_3(SO_4)_2(OH)_6](s) + 6ZnSO_4(aq). \quad (1)$$

By this precipitation process a zinc sulfate solution is obtained which has a relatively low iron concentration; the solution is fed directly to the neutral leach. The calcine quantity required by the neutralization of acid and the precipitation of jarosite is, in general, considerable. In most cases it is approximately 30% of the total feed of calcine. The ferrites present in this calcine do not dissolve under the iron precipitation conditions and remain in the jarosite precipitate. A process has been developed for the recovery of the zinc present in the ferrite, i.e. an acid wash of the jarosite precipitate, in which the ferrites present in the precipitate are dissolved, while the jarosite remains undissolved (Norwegian Pat. No. 123,248). In this zinc ferrite process, an additional stage, pre-neutralization, is often used between the strong-acid leach and the jarosite precipitation. During this preneutralization stage, free acid is neutralized up to the jarosite precipitation point by means of calcine; this intermediate stage diminishes the need for calcine in jarosite precipitation. It can be seen that the neutralization required by iron precipitation, as well as the feed of calcine to the precipitation stage, complicates the process to a considerable degree. Besides, the insoluble components of calcine remaining in the jarosite precipitate render the precipitate so impure that it is not a suitable raw material for iron production processes. Furthermore, the lead, silver and gold contents of the calcine fed into the precipitation process are also lost; in some cases these contents have a value high enough to make their recovery economically worthwhile. In general it is necessary to drive the jarosite precipitate, with its lead, silver and gold contents, to a waste disposal area. Owing to the limited washing-water intake capacity which is characteristic of the process, the washing of the jarosite precipitate remains insufficient. For this reason the precipitate further contains considerable quantities of heavy metals (Zn, Cd, Cu) in a water-soluble form. This involves a considerable loss of the metal. In addition, water-soluble heavy metals constitute an environmental hazard and must be brought, by a suitable treatment of the precipitate, to scarcely soluble forms, harmless for the environment.

Subsequent processes have been developed which eliminate some of the drawbacks of the process described above. There is, for example, a process in which the dissolution of the ferrites and the precipitation of jarosite take place simultaneously (U.S. Pat. No. 3,959,437), in which case a high recovery of zinc, copper and cadmium is achieved by simple apparatus and processes. Nevertheless, even in this case, the lead, silver and gold contents of the calcine are lost, along with the jarosite precipitate, and the iron precipitate is not a suitable raw material for iron production.

In another process (Japanese Pat. No. 48-7961) the iron is precipitated in an autoclave. The objective is to obtain an iron precipitate so pure that it is suitable as such for iron production. In this process the ferrites are leached by means of sulfuric acid and $SO_2$ gas. The iron present in the solution is now in the ferrous form. The solution is neutralized before the precipitation of iron. The iron is oxidized to the ferric form and is precipitated in an autoclave. The aim of this process is to precipitate iron as haematite ($Fe_2O_3$). However, the formation and stability conditions of haematite set certain limitations on the precipitation and thereby also on the process. The precipitation temperature being between 180° and 200° C., $Fe_2O_3$ is not stable above a sulfuric acid concentration of 60–65 g/l. When ferrous iron is precipitated as haematite, sulfuric acid is released at 1.75 g $H_2SO_4$/g Fe; when ferric iron is precipitated as haematite, sulfuric acid is released at 2.6 g $H_2SO_4$/g Fe. In the former case—assuming that the free acid is completely neutralized—iron can be precipitated as haematite at a maximum rate of 33–36 g Fe/l and in the latter case at approximately 23–24 g Fe/l without autoclave neutralization of the acid produced in the reaction. If a solution with relatively high iron and sulfuric acid concentrations (e.g. $[Fe^{3+}] \approx 50$–100 g/l and $[H_2SO_4] \approx 50$–100 g/l) is fed into the autoclave, the iron precipitates, when the temperature in the autoclave is approximately 180°–200° C., as a basic sulfate, $FeSO_4OH$ (E. Posnjak, H. E. Merwin, J. Amer. Chem. Soc. 44 (1922) 1965). It proves impossible to combine simple precipitation of pure haematite in an autoclave and the aim, natural in terms of simplification of the process, of diminishing the volume flows of the process solutions, which would lower investment and heating costs, but which would also increase the iron and acid concentrations in the solutions.

In all the zinc ferrite treatment processes described, considerable quantities of neutralizing agent are required. Normally, in zinc plants, neutralizing agent is available in sufficient quantities in the form of zinc oxide present in the zinc calcine. Attempts at solving this problem have usually resulted in multi-stage processes, losses of valuable metals, and large quantities of polluting wastes.

There are also cases in which neutralizing agents are not available in sufficient quantities. This is the case especially in the treatment processes of various complex ores. For example, many sulfidic Zn-Pb, Zn-Cu, Cu-Pb, and Zn-Cu-Pb concentrates may contain such large quantities of iron that, when they are subjected to an oxidizing roasting at approximately 900° C., the product of the roasting may contain primarily ferritic components and only a lesser quantity of pure oxide phases. Processes of the types described above cannot be used for the treatment of such roasting products, since sufficient quantities of natural neutralizing agent, the pure oxide phase of the calcines, are not available for the neutralization of the acid solutions produced by the leach of the ferrites and by the precipitation of iron.

The problem of treating ferritic raw materials of the above type is, however, solved by the process according to the present invention. The invention is also highly applicable to the treatment of ferrites in connection with zinc processes, and it solves several problems involved in the electrolytic zinc process.

SUMMARY OF THE INVENTION

According to the present invention the metal sulfate solution separated from the iron precipitate is exposed to evaporation in order to crystallize and separate the metal sulfates from the mother liquor, which is recycled to the treatment stage performed with sulfuric acid solution, and the separated metal sulfate is recovered.

DESCRIPTION OF THE PREFERRED EMBODIMENTS

Figure 1:
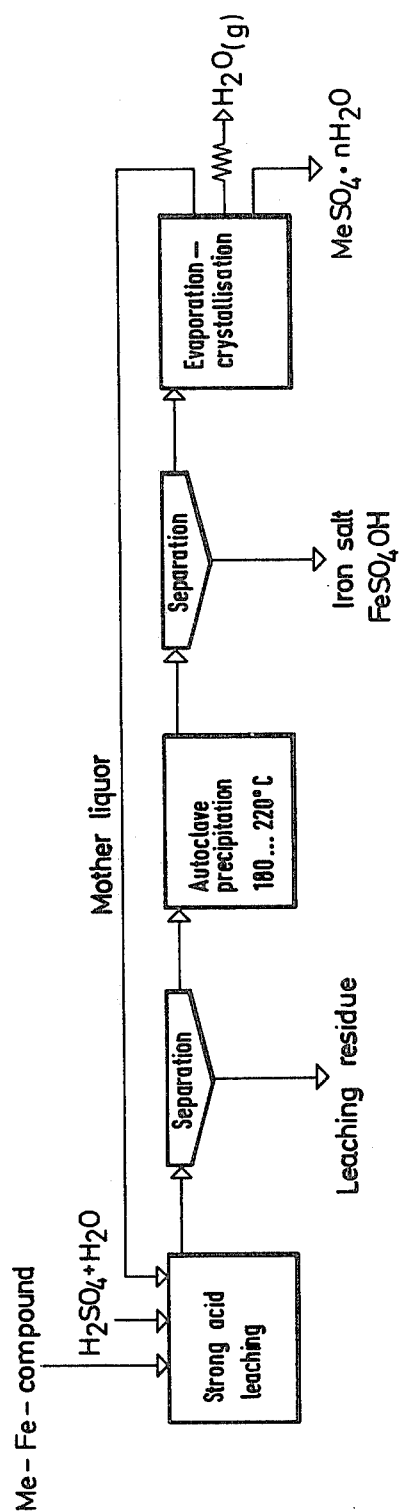

The invention is based on a combination of different operations, namely, iron being separated from the $Fe_2(SO_4)_3$—$MeSO_4$—$H_2SO_4$—$H_2O$ solution after the strong acid leach of ferrites, the $MeSO_4$—$nH_2O$ salt and a relatively strong $Fe_2(SO_4)_3$-bearing sulfuric acid solution being separated in an evaporation-crystallization stage after the separation of iron, and the salts and solutions produced by these stages being either treated further or directed to the process.

It has been shown that $ZnSO_4$ and other Me sulfates can be relatively selectively salted out from the $MeSO_4$—$Fe_2(SO_4)_3$—$H_2SO_4$—$H_2O$ solution with suitable prerequisites and under suitable conditions, and by exploiting this salting out, the treatment of the above calcines, which contain small quantities of pure oxide phase, can be performed practically without any other reagents, in the following manner, for example: after a strong acid leach, the sulfuric acid concentration in the solution being in the range 5–150 g/l and usually being 50–100 g/l, the solution is fed, without neutralization, into an autoclave, where most of the iron present in the solution is precipitated as a basic sulfate, $FeSO_4OH$. As the solution is evaporated and cooled after the precipitation of the iron and the separation of the solid material, the $MeSO_4$—$nH_2O$ is salted out of the solution.

After the separation of the salt the mother liquor is returned to the strong acid leach. The acid of the mother liquor is used for the leaching of ferrites, and after the leaching stage, the iron remaining in the solution is circulated, with the iron dissolved from the ferrites, to the autoclave, in which most of the iron precipitates. During the evaporation-crystallization stage, most of the zinc content of the solution is salted out. The salt can be made nearly free of acid and iron by means of a wash. Thereafter the salt can be dissolved in, for example, water, and the solution thereby obtained requires only a small amount of neutralizing agent. The neutralized solution can now be fed to the solution purification and from there on to electrolysis. The process is characterized in that the iron concentration in the solution fed into the autoclave is very high, 100 g Fe/l or even higher. Since the iron circulates in a cycle consisting of the leach, the autoclave and the evaporation-crystallization, iron need not be precipitated completely out from the solution. The quantity of iron to be precipitated in one cycle of the process is very high, $\Delta[Fe] \approx 70$–80 g/l. This results in that the volume flow of the solution in iron precipitation is small per mass unit of iron to be precipitated. If it is also taken into consideration that the precipitation velocity of iron in the autoclave is very high, this leads to a relatively small reactor volume in the autoclave. Respectively, the reactor volume required for the strong acid leach is small because of the high sulfuric acid concentration in the solution fed to this stage.

If, on the other hand, an inexpensive neutralizing agent is available (for example, if the process is used for treating ferrite precipitate from a zinc process, where calcine is available), the solution can also be pre-neutralized before it is fed into the autoclave. This makes it possible to precipitate the iron in the form of salts other than $FeSO_4OH$, for if the acid at this stage is of a low concentration (e.g. 5 g/l), the iron can be precipitated as haematite and/or hydronium jarosite by a suitable selection of the temperature. The composition of the feed solution, as regards acid and iron, can be technically selected freely in connection with the zinc process, and thus the iron product desired can also be selected freely. Haematite and jarosite have an advantage over FeSO$_4$OH in that they are scarcely soluable in water, and thus they can also be transported to a waste disposal area.

As can be seen, by the present invention, metal sulfates almost devoid of iron can be separated from an acid ferric iron and metal sulfate solution, and the solution containing acid and iron can be returned to the stage which precedes the iron removal stage, and at which the acid is at least partly neutralized. This procedure prevents excessive cycling of iron, which can often be disadvantageous. The invention can thus be used even when ferrite is treated by the process described in U.S. Pat. No. 3,959,437. At the "conversion stage", during which the ferrite dissolves, the jarosite dissolves, and the jarosite precipitates in the presence of NH$_4$ and/or alkali ions, a solution is obtained in which both the acid and iron concentrations are still relatively high. The metal sulfate can now be crystallized out from this solution, and the mother liquor is returned to the "conversion stage," which prevents the circulation of iron to other stages of the zinc process. This makes it possible to use higher acid concentrations at the "conversion stage," in which case the ferrite-dissolving velocity is higher, while the quantity of iron remaining in the solution is also higher.

FIG. 1 shows the "basic process" of the invention. Raw material and sulfuric acid solution are fed to the leaching stage. The raw material is leached and a Fe$_2$(SO$_4$)$_3$—MeSO$_4$—H$_2$SO$_4$—H$_2$O solution is obtained as the result. The solution is fed, either as such or after pre-neutralization, into the autoclave, in which most of the iron is precipitated. The iron precipitate is separated and the solution passes into an evaporation-crystallization unit, in which the MeSO$_4$—nH$_2$O crystallizes. The mother liquor is returned to the strong acid leach. As can be seen, the process produces only H$_2$O vapor, MeSO$_4$·nH$_2$O, and iron salt. In MeSO$_4$·nH$_2$O, the Me can be Zn, Cu, Cd, Co, Ni, Mg, Mn.

At higher acid concentrations the precipitation of iron in an autoclave takes place according to Reaction Equation (2):

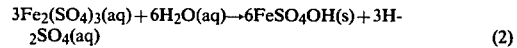

$$3Fe_2(SO_4)_3(aq) + 6H_2O(aq) \rightarrow 6FeSO_4OH(s) + 3H_2SO_4(aq) \qquad (2)$$

and at lower acid concentrations according to Reaction Equations (3) and (4):

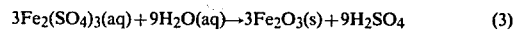

$$3Fe_2(SO_4)_3(aq) + 9H_2O(aq) \rightarrow 3Fe_2O_3(s) + 9H_2SO_4 \qquad (3)$$

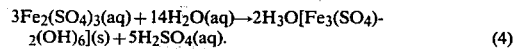

$$3Fe_2(SO_4)_3(aq) + 14H_2O(aq) \rightarrow 2H_3O[Fe_3(SO_4)_2(OH)_6](s) + 5H_2SO_4(aq). \qquad (4)$$

Figure 2:
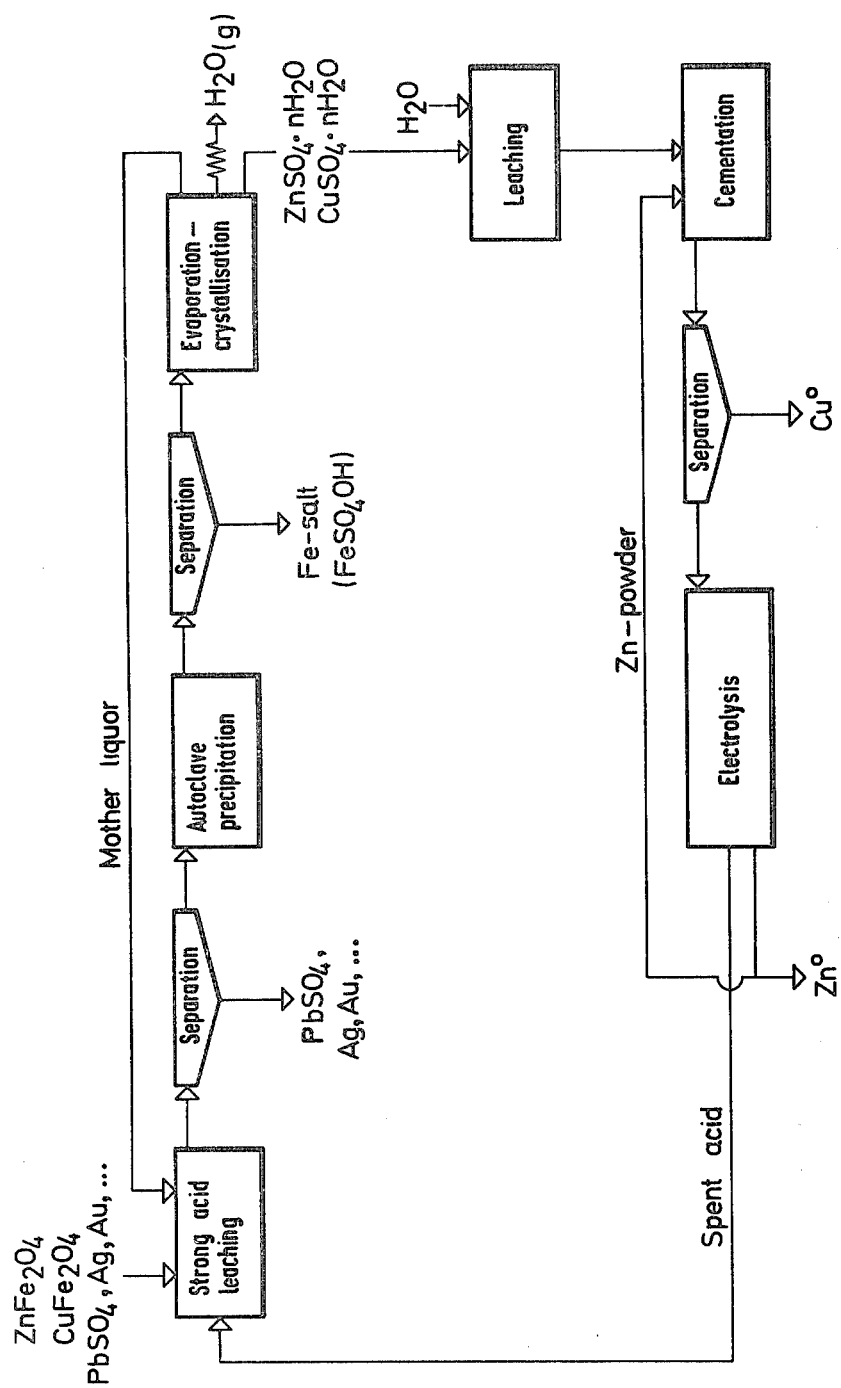

In FIG. 2 the process has been applied to a raw material consisting mainly of zinc ferrite but also containing some copper ferrite and lead sulfate. The zinc is recovered electrolytically, and the copper is recovered as cement copper. If the copper quantity is high, some other known process for the separation of zinc and copper can also be used, and the copper-bearing precipitate or solution can be further treated.

Figure 3:
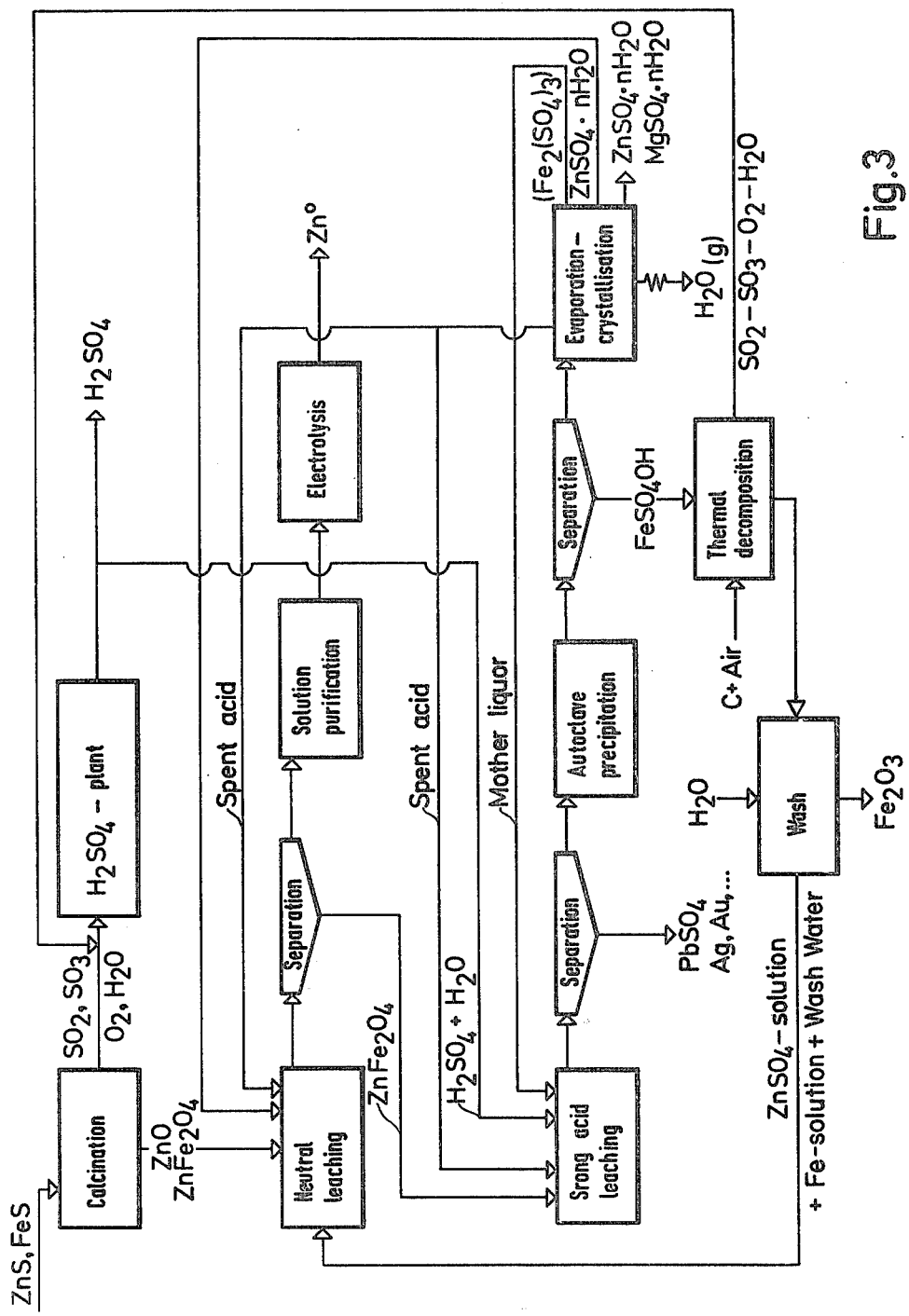
Figure 4:
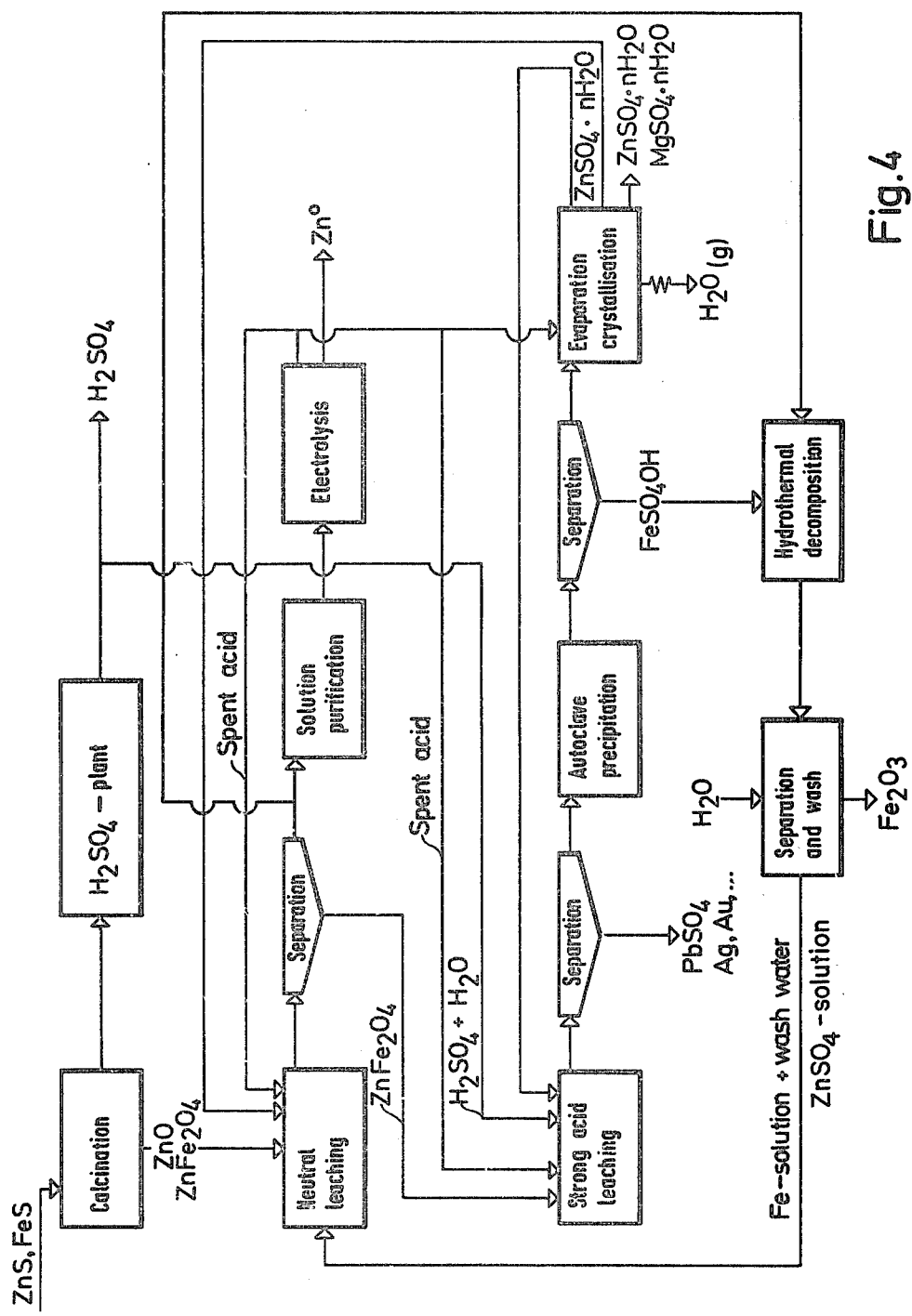

In FIG. 3 the process has been integrated into an electrolytic zinc process, in which the initial raw material is the residue from the neutral leach. In addition to the "basic process," a further treatment of iron precipitate has now been linked to the total process. In the case illustrated by FIG. 3, the iron precipitate has been decomposed thermally. This is preferably performed within the temperature range 650°–750° C., using for fuel carbon or pyrite, for example. The iron salt decomposes, thereby forming haematite, Fe$_2$O$_3$, and SO$_2$—SO$_3$—O$_2$—H$_2$O gas. Under these conditions of thermal decomposition, ZnSO$_4$ is stable and can be washed from iron oxide; thereby a very pure haematite, Fe$_2$O$_3$, is obtained, which is as such suitable for iron production, for example. The gas is fed into the gas flow of the zinc-smelting plant, preferably into the waste heat boiler, and from there on, through gas purification stages, to the sulfuric acid plant. The treatment of the iron precipitate can also be performed hydrothermally (FIG. 4). It is also possible to convert the precipitate, by means of treatment with a base in an aqueous solution, to geohite, magnetite or haematite, whereby the cation of the base passes into the solution as sulfate. The solid material and the sulfates of the solution can be produced by known methods as commercial products. FIG. 3 shows that acid is taken into the strong acid leach in two forms, either as electrolysis return acid or as pure sulfuric acid. If pure sulfuric acid is used (plus water for the dilution), the evaporation requirement is minimal. In the process according to FIG. 3, the zinc concentration in the solution rises to approx. 100 g/l in the "basic process." In the evaporation-crystallization, zinc sulfate is removed sufficiently in order to adjust the zinc concentration in the solution to a value suitable for the operation of the process. When return acid is used, zinc sulfate is fed into the cycle together with it, and thereby the need for salting out zinc sulfate increases. The calcine fed to the neutral leach carries some sulfate into the leaching cycle. Sulfate is removed from the system by: the precipitate from the strong acid leach, which is mainly lead sulfate; the iron precipitate; and the outlet precipitate of magnesium. The removal of sulfates must be compensated for by a feed of sulfuric acid or other sulfates suitable for the system.

The process according to the invention offers the following advantages over previous processes:

The need for neutralization in the process is small, and precipitates which have no value and are hazardous to the environment (e.g. gypsum) are not produced in it. If it is taken into consideration that the precipitate from the strong acid leach can be used as raw material in another process (Pb process) and that the washed oxide of iron, obtained from the thermal decomposition, hydrothermal decomposition, or base treatment of iron precipitate, can be fed to iron production or some other use, it is highly appropriate to speak of a waste-free process.

When this process is applied to the zinc process, the Pb, Ag and Au virtually all pass into the precipitate from the strong acid leach, and thus can be recovered, a fact which is of obvious economic importance. If the precipitate is without value, the waste to be removed from the process has been minimized.

The iron entering the process is removed from the process in a form in which it can be converted to a raw material suitable for iron production, or in which it can be used as such for various purposes.

The yields of zinc, copper and cadmium are very high, since all the ferrites can be dissolved in the strong acid leach and, by means of a good wash, the zinc concentrations in the precipitates removed from the system can be greatly diminished.

The iron precipitation stage is insensitive to the acid concentration of the solution since, of the salts precipitating within the temperature range used, FeSO$_4$OH in particular is stable within a very wide H$_2$SO$_4$ concentration range. For this reason the strong acid leach can be operated at such a high acid concentration that the dissolving of the ferrites is rapid and also complete.

The maintenance of the aqueous balance in the process allows the use of considerable washing water volumes for the washing of the precipitates in order to obtain a good washing result. This alone results in a total zinc yield which is approximately 0.5–1.0% higher than that obtained by current practices.

The invention is described below in more detail with the aid of examples.

EXAMPLE 1

The table below shows the results obtained by precipitating iron from acidic ZnSO$_4$ and Fe$_2$(SO$_4$)$_3$ solutions of varying composition. All these solutions are theoretically obtained by the strong acid leach of zinc ferrite residue. Low iron concentrations are obtained if the underflow from the thickener is leached using electrolysis return acid, higher concentrations are obtained if the underflow is filtered before the leach, and the highest iron concentrations of all are obtained (Fe$\approx$100 g/l) if the filtered underflow is leached using pure sulfuric acid solution according to FIG. 1.

A low acid concentration (H$_2$SO$_4\approx$5 g/l) is obtained by pre-neutralizing the solution obtained from a leach performed with strong acid, or by a countercurrent extraction by means of strong acid in several stages.

Table 1

| Initial solution | | | Final solution | | | Solid | | | |
|---|---|---|---|---|---|---|---|---|---|
| Temperature °C. | Fe g/l | H$_2$SO$_4$ g/l | Zn g/l | Fe g/l | H$_2$SO$_4$ g/l | Fe % | SO$_4$ % | Zn % | Compound |
| 200 | 23 | 5 | 100 | 3.1 | 55 | 66.5 | 3.4 | 0.05 | 1; (2) |
| 250 | 35 | 5 | 100 | 5.2 | 77 | 69.4 | 0.4 | 0.03 | 1 |
| 200 | 35 | 5 | 100 | 3.7 | 55 | 48.3 | 37.5 | 0.06 | 2; (1) |
| 140 | 35 | 10 | 100 | 11 | 45 | 34.2 | 40.6 | 0.08 | 2 |
| 200 | 49 | 6 | 100 | 18 | 75 | 33.7 | 40.5 | 0.18 | 2 |
| 200 | 50 | 50 | 100 | 15 | 80 | 32 | 57.3 | 0.87 | 3 |
| 200 | 100 | 5 | 100 | 24 | 83 | 32.8 | 51.5 | 0.67 | 3; (2) |
| 200 | 100 | 50 | 100 | 22 | 140 | 31.5 | 57.7 | 0.89 | 3 |

1. Fe$_2$O$_3$;
2. H$_3$O[Fe$_3$(SO$_4$)$_2$(OH)$_6$];
3. FeSO$_4$OH

The final solutions obtained were evaporated to as high a degree as possible, so that the zinc quantity crystallized corresponded to at least ⅔ of the total iron quantity precipitated (⅔ for the reason that this is approximately the Zn/Fe ratio in ferrites).

Table 2

| Initial solution | | | Final solution | | | Crystals | | |
|---|---|---|---|---|---|---|---|---|
| Zn g/l | Fe g/l | H$_2$SO$_4$ g/l | Zn g/l | Fe g/l | H$_2$SO$_4$ g/l | Zn % | Fe % | SO$_4$ % |
| 100 | 3.7 | 55 | 205 | 14.8 | 203 | 23.3 | 0.05 | 36.8 |
| 100 | 24 | 83 | 172 | 7.1 | 243 | 24.1 | 0.80 | 41.4 |
| 100 | 22 | 140 | 41 | 22 | 690 | 19.8 | 3.8 | 52 |

EXAMPLE 2

In the embodiment of the process illustrated by Example 2, the coupling according to FIG. 2 was used.

A ferritic raw material with the following composition was fed at a rate of 308 kg/h to the strong acid leach: Zn 14.2%, Cu 7.0%, Pb 16.1%, Fe 32.5%, Ag 300 ppm, and Au 30 ppm. The leaching period was 6 h and the temperature 95° C. The sulfuric acid concentration in the solution at the end of the leach was 90 g/l. The solid and the solution were separated. The Pb content of the washed and dried leach residue was 49.8%, its Ag content 970 ppm, and its Au content 102 ppm. The Fe concentration in the solution passing to autoclave precipitation of iron was 62.6 g/l, its Cu concentration 16 g/l, and its Zn concentration 61 g/l. At the iron precipitation stage the temperature was 205° C. and the retention time 2 h. The iron precipitate and the solution were separated. The rate of dried and washed iron precipitate was 307 kg/h and its Fe concentration was 32.5%. The H$_2$SO$_4$ concentration in the solution which was fed into the evaporation-crystallization stage was 127 g/l and its Fe concentration 21 g/l. The temperature of the evaporation-crystallization was 74° C. The Zn, Cu and Fe concentrations in the solid which was separated at the reaction stage and lightly washed were 25.0%, 6.1% and 0.7%, respectively. The rate of solution fed from the evaporation-crystallization stage, after the separation of the crystals, into the strong acid leach, was 0.89 m$^3$/h and its H$_2$SO$_4$, Fe, Zn, and Cu concentrations were 437 g/l, 54 g/l, 65 g/l, and 18.5 g/l, respectively. The crystalline precipitate which was formed at the evaporation-crystallization stage and which was lightly washed was leached in water. During the leach, the pH of the solution was adjusted by zinc calcine additions. The pH of the solution was maintained between 2 and 3. The zinc concentration in the solid-free solution was 131 g/l and its copper concentration 29.3 g/l. The copper was separated from the solution by zinc powder cementation. Zinc powder was needed for the cementation at 23 kg/h. The copper-free solution was fed, after additional purification stages, to zinc electrolysis. The yields of zinc and copper from the process were 99.7% and 99.8%, respectively.

EXAMPLE 3

The coupling according to FIG. 3 was used in the embodiment of the process illustrated by Example 3.

1000 kg of zinc calcine was fed to the neutral leach, the composition of the zinc calcine being: Zn 58.0%, Fe 10.0%, Pb 3.0%, Cd 0.22%, Cu 0.54%, Ag 0.0085%. The leaching period was 2 h and the pH was 2.5. The solid and the solution were separated. The zinc, iron and lead content of the solid was: Zn 17.0%, Fe 19.5%, and Pb 5.3%. The solid was fed into the strong acid leach. The leaching period was 10 h and the temperature was 95° C. At the end of the leach the sulfuric acid concentration in the solution was 80 g/l. The solid and the solution were separated. The Pb concentration in the washed and dried leach residue was 4.5% and its Ag concentration 0.13%. The composition of the solution passing to the autoclave precipitation of iron was Zn 99 g/l and Fe 100 g/l. In the iron precipitation, the temperature was 200° C. and the retention time 2 h. The iron precipitate and the solution were separated. The quantity of dried and washed iron precipitate was 305 kg and its Fe concentration 32.7%. The $H_2SO_4$ concentration in the solution fed from the autoclave into the evaporation-crystallization stage was 151 g/l, its iron concentration 20.5 g/l, and Zn concentration 100 g/l. Approx. 2 m$^3$ of return acid was fed into the evaporation-crystallization stage and the $H_2SO_4$ concentration of the acid was 180 g/l and its Zn concentration 60 g/l. In the evaporation-crystallization stage the final temperature was 80° C. The composition of the precipitate separated by the crystallization was Zn 23.4%, Fe 1.1%, and $H_2SO_4$ 18.5%. The unwashed crystals were fed into the neutral solution. The mother liquor from the evaporation-crystallization stage, 0.76 m$^3$, with a composition of $H_2SO_4$ 690 g/l, Zn 40.6 g/l, and Fe 22.3 g/l, was returned to the strong acid solution. The iron precipitate from the autoclave was decomposed thermally at 710° C. The $SO_2$ gas generated was fed into the smelting plant, and the haematite produced was washed with water and separated by filtration. The washing waters were fed to the neutral leach. The settled neutral solution was fed, after solution purification stages, to zinc electrolysis. The zinc yield from the process was 99.6%.

What is claimed is:

1. A hydrometallurgical process comprising leaching a ferritic raw material which contains one or more of the other metals zinc, cobalt, copper, nickel, cadmium, magnesium and manganese with an aqueous sulfuric acid solution at an elevated temperature to dissolve the iron and other metal and to produce a metal sulfate solution, removing any solid material from the metal sulfate solution and then treating the solution at elevated temperature and pressure to precipitate ferric iron and separating said ferric iron from the metal sulfate solution, subjecting the metal sulfate solution to evaporation in order to crystallize the metal sulfates from a mother liquor; separating the metal sulfates from the mother liquor; recycling the mother liquor to the stage of leaching at elevated temperature with sulfuric acid solution; and recovering the separated metal sulfates.

2. The process of claim 1, in which the precipitation of ferric iron is performed in an autoclave within the temperature range of from 140° C. to 250° C.

3. The process of claim 2, in which the sulfuric acid concentration in the solution fed to the autoclave precipitation is 5–150 g/l.

4. The process of claim 1, in which a metal sulfate which contains at least zinc and copper is leached in water, copper is cemented from the solution by means of zinc powder, the solution is electrolyzed by a electrowinning process in order to recover the zinc, and return acid is recycled to the leaching performed using sulfuric acid.

5. The process of claim 1, in which a basic sulfate of iron separated from the metal sulfate solution is exposed to thermal decomposition, gases from the thermal decomposition are recovered and used for sulfuric acid production, obtained haematite is washed with water, and the washing solution is fed to a leach of calcine at elevated temperature, together with the metal sulfate solution and return acid, in order to produce the raw material which contains iron and other metals.

6. The process of claim 5, in which the thermal decomposition is performed at 650°–750° C., using carbon or pyrite as fuel.

7. The process of claim 1 for the treatment of ferrites in which the ferrites are leached in a sulfuric acid-bearing solution, whereafter an undissolved residue is separated and the solution is fed into an autoclave, in which ferric iron is precipitated, then the iron precipitate is separated, the acidic metal sulfate solution is fed to the evaporation-crystallization stage, at which the metal sulfates are crystallized and separated, and finally the mother liquor is returned to the ferrite-leaching stage.

8. The method of claim 1 further comprising adding a neutralizing agent to the solution obtained from the leaching of the ferritic raw material at elevated temperature and pressure.

* * * * *

UNITED STATES PATENT AND TRADEMARK OFFICE
CERTIFICATE OF CORRECTION

PATENT NO. : 4,219,354
DATED : August 26, 1980
INVENTOR(S) : Jussi K. Rastas et al It is certified that error appears in the above—identified patent and that said Letters Patent are hereby corrected as shown below:

Column 1, line 22,

"iron-bearing sulfidic acid concentrates" should read:

--iron-bearing sulfidic zinc concentrates--.

Signed and Sealed this

Third Day of February 1981

[SEAL]

*Attest:*

RENE D. TEGTMEYER

*Attesting Officer*   *Acting Commissioner of Patents and Trademarks*